US008902498B2

(12) United States Patent
Cook

(10) Patent No.: US 8,902,498 B2
(45) Date of Patent: Dec. 2, 2014

(54) BROAD SPECTRAL TELESCOPE

(75) Inventor: Lacy G. Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 978 days.

(21) Appl. No.: 12/635,853

(22) Filed: Dec. 11, 2009

(65) Prior Publication Data
US 2011/0228383 A1 Sep. 22, 2011

(51) Int. Cl.
G02B 13/14 (2006.01)
G02B 1/02 (2006.01)
F41A 23/24 (2006.01)
F41G 1/393 (2006.01)

(52) U.S. Cl.
CPC ............. *G02B 13/146* (2013.01); *G02B 1/02* (2013.01); *F41A 23/24* (2013.01); *F41G 1/393* (2013.01)
USPC ........................................ 359/356

(58) Field of Classification Search
USPC .................................. 359/355–357
See application file for complete search history.

(56) References Cited

U.S. PATENT DOCUMENTS

| 5,781,336 | A | * | 7/1998 | Coon et al. | 359/355 |
| 5,838,489 | A | * | 11/1998 | Erdmann | 359/357 |
| 5,973,859 | A | * | 10/1999 | Abe | 359/794 |
| 6,950,243 | B2 | * | 9/2005 | Wiese et al. | 359/689 |
| 7,218,444 | B2 |   | 5/2007 | Cook |  |

FOREIGN PATENT DOCUMENTS

| EP | 1 355 180 A2 | 10/2003 |
| GB | 2 206 704 A | 1/1989 |

OTHER PUBLICATIONS

Int'l Crystal Labs., "Zinc Sulfide (ZnS) Optical Crystals," http://www.internationalcrystal.net/optics_19.htm, 2 pages.
Walker, A.C., "Achromatic doublets for simultaneous imaging of IR (10.6-um) and visible (0.6328-um) radiation", Applied Optics, vol. 20, No. 24, pp. 4143-4144 (Dec. 1981).
Jamieson, T. H., "Ultrawide waveband optics", Optical Engineering, vol. 23, No. 2, pp. 111-116 (Mar.-Apr. 1984).
Jamieson, T. H., "Decade wide waveband optics", SPIE, vol. 3482, pp. 306-320 (1998).
European Search Report dated Mar. 14, 2011 of European Application No. 10290548.6 filed Oct. 11, 2010 (7 pages).
Extended European Search Report and Opinion for EP Application No. 10290548.6, dated Mar. 14, 2011, 7 pages.

* cited by examiner

*Primary Examiner* — Derek S Chapel
(74) *Attorney, Agent, or Firm* — Christie, Parker & Hale, LLP

(57) ABSTRACT

An optical assembly includes: a first lens comprising a crown material; a second lens comprises a primary flint material for wavelengths below about 1.0 μm; and a third lens comprising a secondary flint material for wavelengths below about 1.0 μm, wherein the first, second and third lenses together are configured to transmit light and function in the visible, mid-wavelength infrared (MWIR) and long-wavelength infrared (LWIR) regions of the electromagnetic spectrum. In some implementations, the optical assembly may be configured as an afocal Galilean telescope having an objective lens assembly and a eyepiece lens assembly.

16 Claims, 6 Drawing Sheets

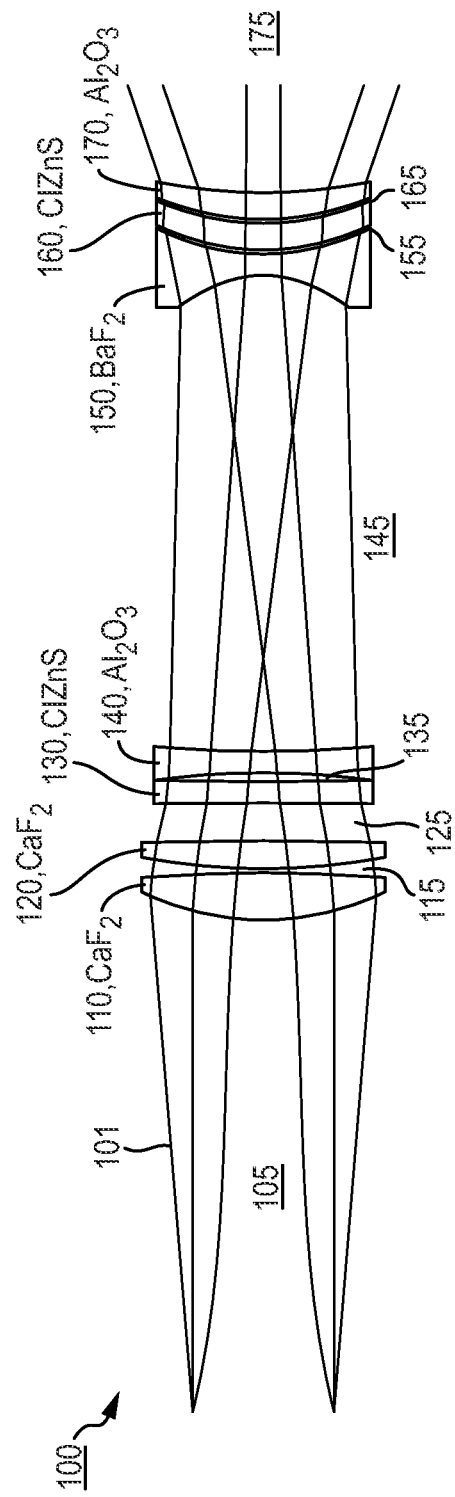
Fig. 1 (Conventional)

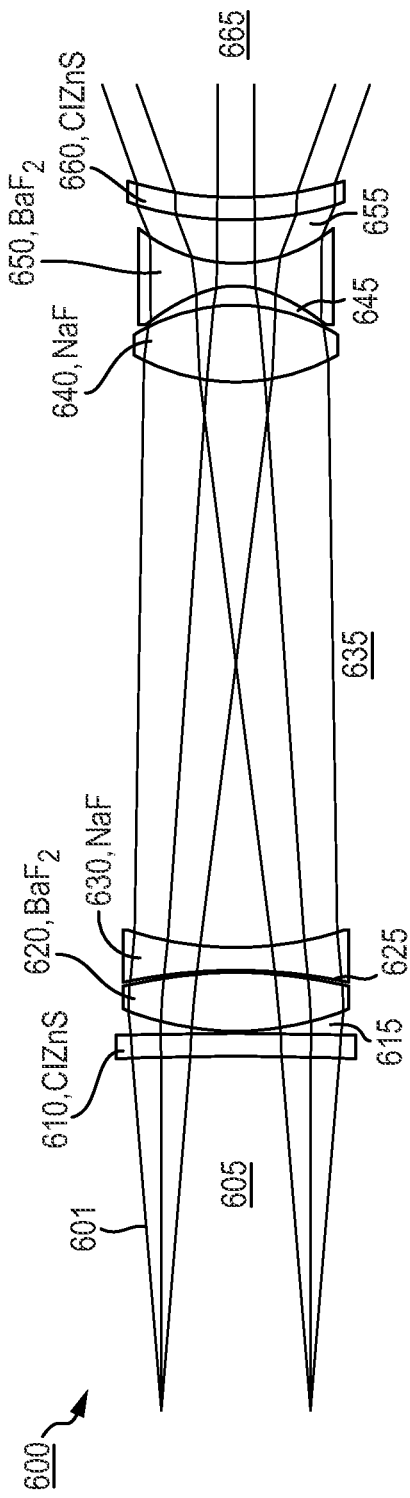

BROAD SPECTRAL TELESCOPE

GOVERNMENT RIGHTS

This invention was made with Government support from the Defense Microelectronics Activity under contract number H94003-04-D-0006. The U.S. Government may have certain rights in this invention.

BACKGROUND

The application generally relates to optical elements, and in particular, materials and configuration for optical assemblies and telescopes.

Refractive optics assemblies adapted for both the visible (approximately 400-700 nm) and the mid-wavelength infrared (MWIR) (approximately 3-5 μm) portions of the electromagnetic spectrum are known.

FIG. 1, for example, shows a raytrace schematic of a conventional optical assembly. Conventional optical assembly 100 may be configured as a wide-field of view (WFOV) Galilean afocal telescope as shown. One such attachment is used in the a helicopter targeting turret system.

Conventional optical assembly 100 generally includes first lens 110, second lens 120, third lens 130, fourth lens 140, fifth lens 150, sixth lens 160 and seventh lens 170. First through fourth lenses 110-140 may be arranged to form an objective, while fifth to seventh lenses 150-170 may be arranged to form an eyepiece. A housing (not shown) is provided to support the various lens elements. Optical assembly 100 is approximately 4.0 inches in length and 1.0 inch in diameter.

In use, light rays 101 in space 105 pass through first lens 110, space 115, second lens 120, space 125, third lens 130, space 135, fourth lens 140, space 145, fifth lens 150, space 155, sixth lens 160, space 165, and seventh lens 170 to space 175.

Using optical assembly 100 causes the focal plane array (FPA) to view more field of view (FOV), but through a smaller aperture. The afocal telescope does not have an intermediate image (or final image, for that matter). Rather, collimated light enters the telescope and collimated light exits the telescope. The telescope is Galilean in that there is no intermediate image, as opposed to Newtonian telescopes which have intermediate images. Newtonian telescopes have real exit pupils while Galilean telescopes do not have real exit pupils.

Table 1 shows one optical prescription for conventional optical assembly 100. The afocal magnification is approximately 4×, by taking an aperture of 0.618 inches and FOV of 9.4 degrees in object space, and converting it into an aperture of 0.153 inches (4× smaller) and FOV of 38.14 degrees (4× larger). Conventional optical assembly 100 is designed in the direction shown in the table, but is actually used in the reverse, where the smaller aperture and wider FOV faces object space, while the larger aperture and smaller FOV is on the FPA side of the optics path. Between this afocal attachment and the FPA there may be imager optics (not shown).

TABLE 1

| PRESCRIPTION FOR CONVENTIONAL VISIBLE AND MWIR AFOCAL TELESCOPE | | | | | | | | |
|---|---|---|---|---|---|---|---|---|
| Surface | Radius | Thickness | Material | CC | Ad | Ae | Af | Ag |
| 105 | Inf | 2.300 | air | | | | | |
| 110 | 1.294 | 0.220 | CaF2 | | | | | |
| 115 | −7.329 | 0.020 | air | | | | | |
| 120 | 3.018 | 0.130 | CaF2 | | | | | |
| 125 | −26.161 | 0.177 | air | | | | | |
| 130 | −56.896 | 0.100 | ClZnS | | | | | |
| 135 | 23.696 | 0.041 | air | | 1.022E−02 | −9.601E−03 | 0.14375 | −0.29522 |
| 140 | −3.679 | 0.100 | Al2O3 | | | | | |
| 145 | 5.468 | 2.226 | air | | | | | |
| 150 | −0.515 | 0.100 | BaF2 | −1.24897 | | | | |
| 155 | 1 090 | 0 018 | air | | | | | |
| 160 | 1.083 | 0.125 | ClZnS | −0.85156 | 6.024E−02 | 0.34278 | −0.26262 | −0.10652 |
| 165 | 1.226 | 0.019 | air | | | | | |
| 170 | 1.199 | 0.125 | Al2O3 | −1.98342 | | | | |
| 175 | 2.459 | 0.500 | Air | | | | | |

Entrance aperture: 0.660 diameter
Entrance FOV: 9.4 deg total
Spectral bands: 0.45-0.75 um, and 3.7-4.8 um
Ad, Ae, Af, Ag are aspheric constants
CC is a conic constant As noted in Table 1, optical assembly 100 is comprised of four materials: barium fluoride ($BaF_2$), clear transient ClearTran zinc sulfide (ClZnS), calcium fluoride ($CaF_2$), and aluminum oxide ($Al_2O_3$). In this assembly, $Al_2O_3$ is used as a crown and $CaF_2$ is used as a flint. At visible wavelengths, the ClZnS lens functions as a flint, and the $CaF_2$, $BaF_2$, and $Al_2O_3$ lenses function as crowns. However, at MWIR wavelengths, the $Al_2O_3$ lens functions as the flint, and the $CaF_2$, $BaF_2$, and ClZnS lenses function as crowns. The term crown generally refers to a low dispersion material, while the term flint generally refers to a high dispersion material.

Optical assembly 100 is capable of transmitting wavelength from 0.48 μm to 4.8 μm, or about 10 octaves. However, this provides transmission in the visible and the MWIR spectra only. The optical system has been optimized to provide best image quality from about 0.45 to 0.75 microns and from 3.7 to 4.8 microns.

In addition, optics assemblies that transmit both the MWIR and long-wavelength infrared (LWIR) (approximately 8-12 μm) portions of the spectrum are known. With the advent of 2-color (MWIR and LWIR) detector arrays, it is desired that certain optical assemblies also cover the visible and both the MWIR and the LWIR infrared bands.

However, an optical assembly for achieving transmission in the visible, MWIR and LWIR portions of the electromagnetic spectrum has not yet been realized.

SUMMARY

In one embodiment, an optical lens assembly comprises: a first lens comprising a crown material; a second lens comprises a primary flint material for wavelengths above about 1.0 μm; and a third lens comprising a secondary flint material for wavelengths below about 1.0 μm, wherein the first, second and third lenses together are configured to transmit light and function in the visible, mid-wavelength infrared (MWIR) and long-wavelength infrared (LWIR) regions of the electromagnetic spectrum.

In another embodiment, an afocal Galilean telescope comprises: a positive-power objective lens assembly comprising: a first negative-power lens comprising a primary flint material; a second positive-power lens comprising a crown material; and a third negative-power lens comprising a secondary flint material; and a negative-power eyepiece lens assembly comprising: a fourth positive-power lens comprising a primary flint material; a fifth negative-power lens comprising a crown material; and a sixth positive-power lens secondary comprising a flint material, wherein the objective lens assembly and the eyepiece lens assembly together are arranged and configured to transmit light and function in the visible, mid-wavelength infrared (MWIR) and long-wavelength infrared (LWIR) regions of the electromagnetic spectrum.

In yet another embodiment, a method of servicing a targeting turret system comprises: removing a telescope assembly from the targeting turret system; and installing an afocal Galilean telescope according to an embodiment in the targeting turret system.

These and other aspects of this disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not a limitation of the invention. In addition, it should be appreciated that structural features shown or described in any one embodiment herein can be used in other embodiments as well.

BRIEF DESCRIPTION OF THE DRAWINGS

FIG. 1 shows a raytrace schematic of a conventional optical assembly;

FIG. 6 shows a raytrace schematic of an optical assembly according to an embodiment.

DETAILED DESCRIPTION

Figure 2:
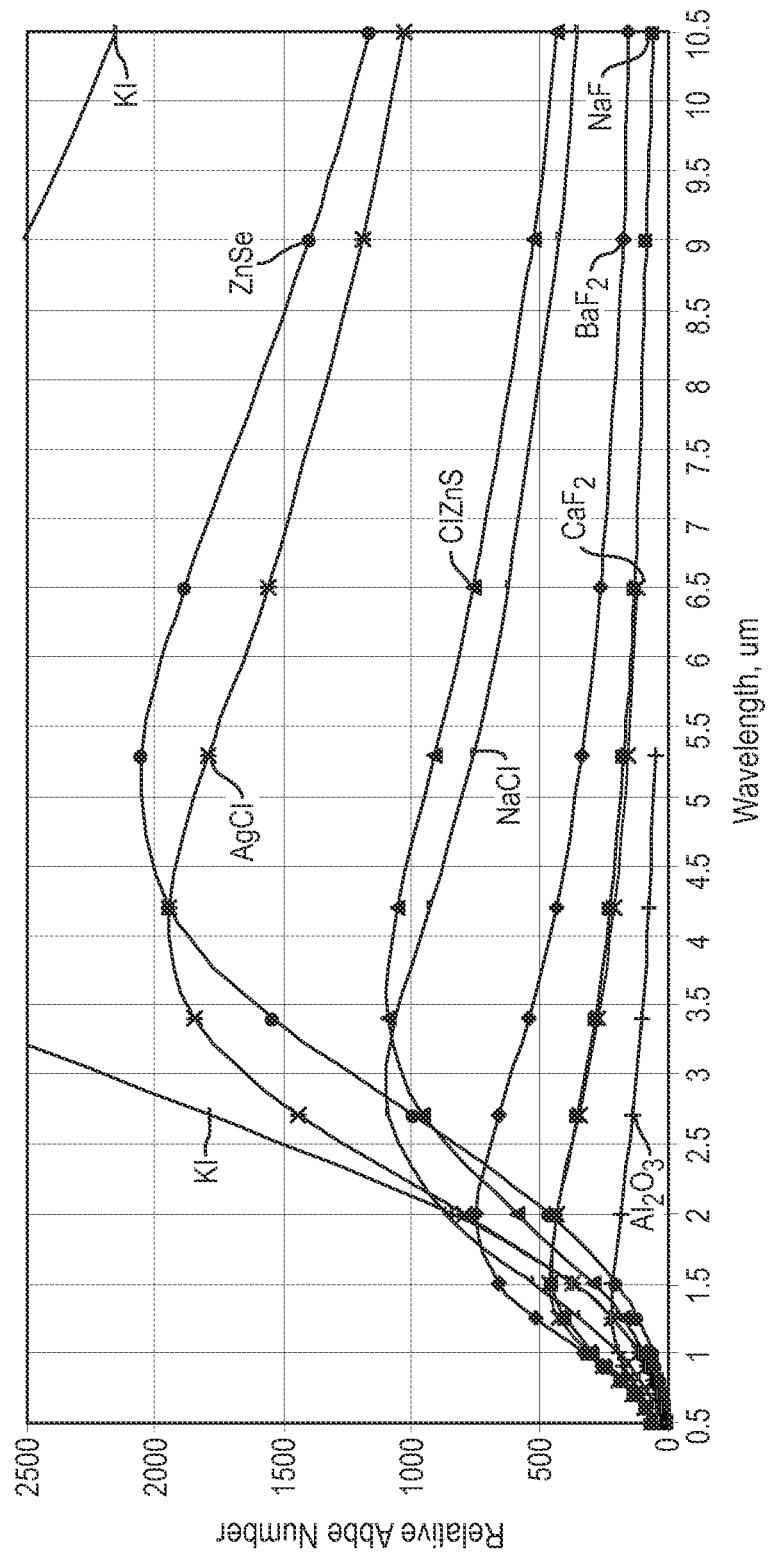
FIG. 2 shows a plot of various materials and their relative Abbe number for wavelengths of light from 0.5 to 10.5 μm.

Few optical materials have useful transmission characteristics in the broad spectral bandpass from about 0.5 μm in the visible spectrum to about 11.0 μm in the LWIR spectrum. The inventor thus endeavored to determine candidate materials which provide such transmission characteristics and to construct an optical assembly.

Various factors for selecting one or more candidate materials for transmission of light were considered. These factors included, but were not necessarily limited to: the transmission characteristics of light in a medium, the refractive index of the material, the rate of change of refractive index, the Abbe number, the softness of material, the hydroscopic nature of the material (i.e., taking up and retaining moisture); the solubility of the material, the cost and availability of the material, and/or the size of the material. Some materials that are transparent over the desired portion of the spectra, for instance, may not be practical do to their physical properties (softness, solubility, etc.) or costs and availability.

The relative Abbe number is a measure of a material's dispersion (i.e., variation of refractive index with wavelength) in relation to the refractive index. The general expression for relative Abbe Number may be determined according to equation (1) as follows:

$$\text{relative Abbe Number} = \frac{n_{avg} - 1}{n_{lower} - n_{upper}} \quad (1)$$

where, $n_{avg}$ is the refractive index of the material at the average (or midpoint) wavelength of the operating band of the material;

$n_{lower}$ is the refractive index of the material at the lower wavelength of the operating band of the material: and $n_{upper}$ is the refractive index of the material at the upper wavelength of the operating band of the material.

If $n_{lower}$ is approximately $n_{upper}$, then denominator will be small and the relative Abbe number is large or crown-like.

A number of materials that were considered by the inventor include: barium fluoride (BaF$_2$), strontium titanate (SrTiO$_3$), sodium fluoride (NaF), spinel (MgAl$_2$O$_4$), magnesium oxide (MgO), sapphire/aluminum oxide (Al$_2$O$_3$), calcium fluoride (CaF$_2$), silver chloride (AgCl), Gallium arsenide (GaAs), cadmium telluride (CdTe), arsenic sulfide (As$_2$S$_3$), AMTIR-1 Ge$_{33}$As$_{12}$Se$_{55}$glass, zinc selenide (ZnSe), zinc sulfide (ZnS), silicon (Si), germanium (Ge), KRs-5 thallium bromoiodide glass, aluminum oxynitride (AlON), sodium chloride (NaCl), potassium (K), potassium iodide (KI), cesium bromide (CsBr), cesium iodide (CsI), potassium bromide (KBr), and potassium chloride (KCl), and others.

Table 2 shows the solubility of various materials in water.

TABLE 2

Material Solubility in water

| Material | Solubility (g/100 ml of water) |
|---|---|
| Al$_2$O$_3$ | 0 |
| CaF$_2$ | 0.002 |
| BaF$_2$ | 0.2 |
| ClZnS | 0 |
| NaF | 4 |
| NaCl | 36 |
| ZnSe | 0 |
| AgCl | 0.0005 |
| KI | 128 |
| CsBr | 124 |
| CsI | 44 |
| KBr | 53 |
| KCl | 35 |

Various materials were then excluded, such as NaCl, KI, CsBr, CsI, KBr, and KCl, for being too soluble (i.e., being greater than 20-25 g/100 ml of water).

Thallium bromoiodide (KRS-5) and others were also excluded for being too soft. Some materials, such as NaCl and others were excluded for being too hydroscopic for use in an optical assembly, such as a telescope. After excluding a number of materials, a few materials remained.

FIG. 2 shows a plot of various materials and their relative Abbe number for wavelengths of light from 0.5 to 10.5 µm. These materials include: barium fluoride ($BaF_2$), sodium fluoride (NaF), clear transient zinc sulfide (ClZnS), calcium fluoride ($CaF_2$), silver chloride (AgCl), zinc selenide (ZnSe) and particularly, clear zinc sulfide (ClZnS), aluminum oxide ($Al_2O_3$), sodium chloride (NaCl), and potassium iodide (KI).

Sapphire ($Al_2O_3$) and calcium fluoride ($CaF_2$) are not useable past 5 and 7 µm wavelengths, respectively. This is because these materials by their nature have an absorption band at those wavelengths, and thus, their transmission approaches zero. IR optical materials exhibit this behavior in the vicinity of an absorption band.

On the other hand, calcium fluoride ($CaF_2$) and sodium fluoride (NaF) are remarkably similar to each other in relative Abbe numbers at wavelengths below 7 µm. Thus, NaF becomes a good replacement/substitute for $CaF_2$ when LWIR performance is desired.

Figure 3:
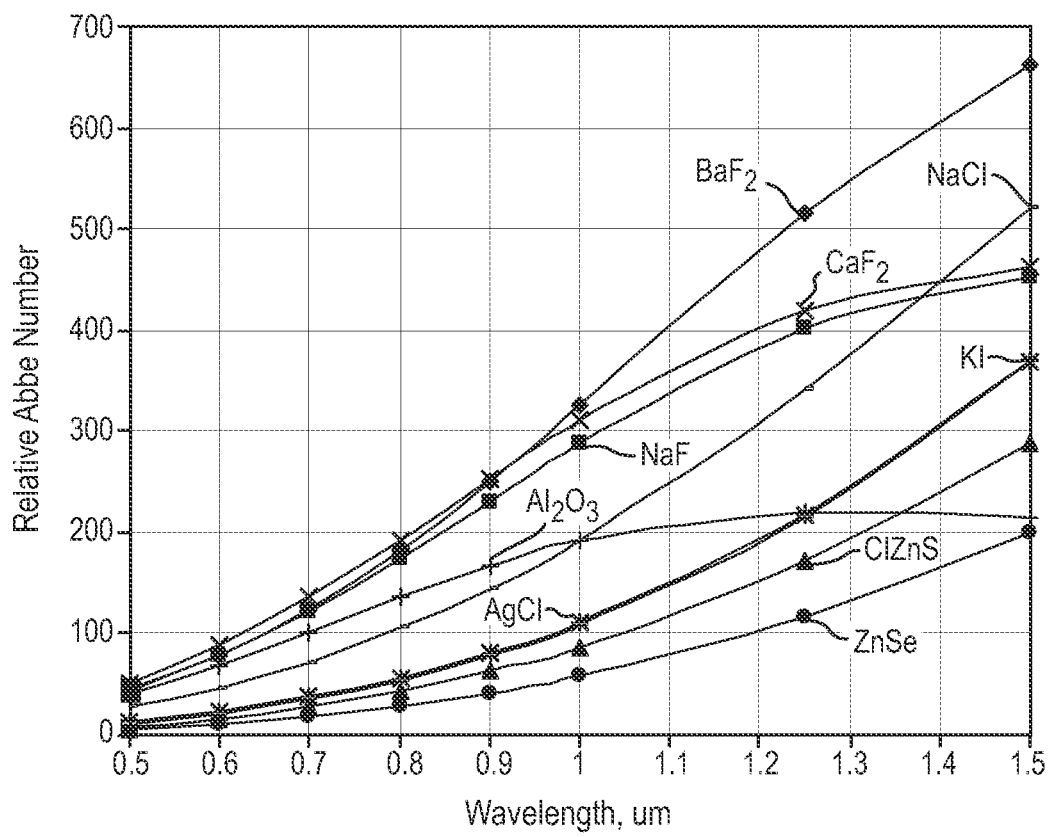
FIG. 3 shows a more detailed view of the plot shown in FIG. 2 for wavelengths of light from 0.5 to 1.5 μm.

FIG. 3 shows a more detailed view of the plot shown in FIG. 2 for wavelengths of light from 0.5 to 1.5 µm. As more clearly shown, $CaF_2$ and NaF continue to show remarkably similar dispersion behavior down through the visible spectrum (i.e., less than about 0.7 µm).

According to an aspect of this disclose, an optical assembly is configured to be transparent to light and function in the visible, mid-wavelength infrared (MWIR) and long-wavelength infrared (LWIR) regions of the electromagnetic spectrum. The lens arrangement includes three types of materials with different dispersion characteristics. The disclosed optical assemblies eliminate the need for typical optical materials, such as, for example, calcium fluoride ($CaF_2$) and sapphire ($Al_2O_3$) which are unsuitable for LWIR transmission having wavelengths of about 8-15 µm.

In one embodiment, three materials may be used for fabricating an optical assembly. These materials include: barium fluoride ($BaF_2$) as the basic crown or low dispersion material, sodium fluoride (NaF) as the primary or basic flint or high dispersion material, and zinc sulfide (ZnS) and, particularly, clear transient ClearTran zinc sulfide (ClZnS) as a secondary or supplemental flint material for additional color correction, especially for the spectrum below 1 µM.

Figure 4:
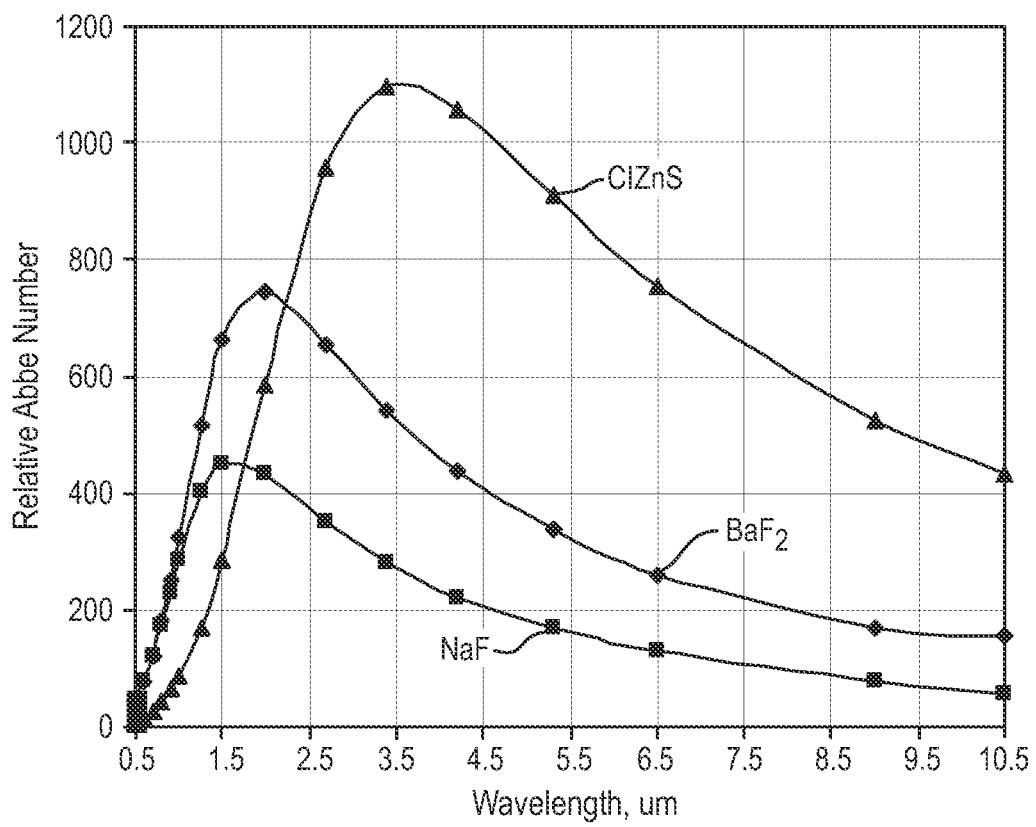
FIG. 4 shows a plot of relative Abbe numbers of NaF, BaF$_2$ and ClZnS for wavelengths of light from 0.5 to 10.5 μm.

FIG. 4 shows a plot of relative Abbe numbers of NaF, $BaF_2$ and ClZnS for wavelengths of light from about 0.5 to 10.5 µm. From about 1.8 to 10.5 µm, $BaF_2$ and NaF maintain consistent crown and flint relationships and functions, respectively, over most of the spectral region of interest (except for the region below 1 µm).

Figure 5:
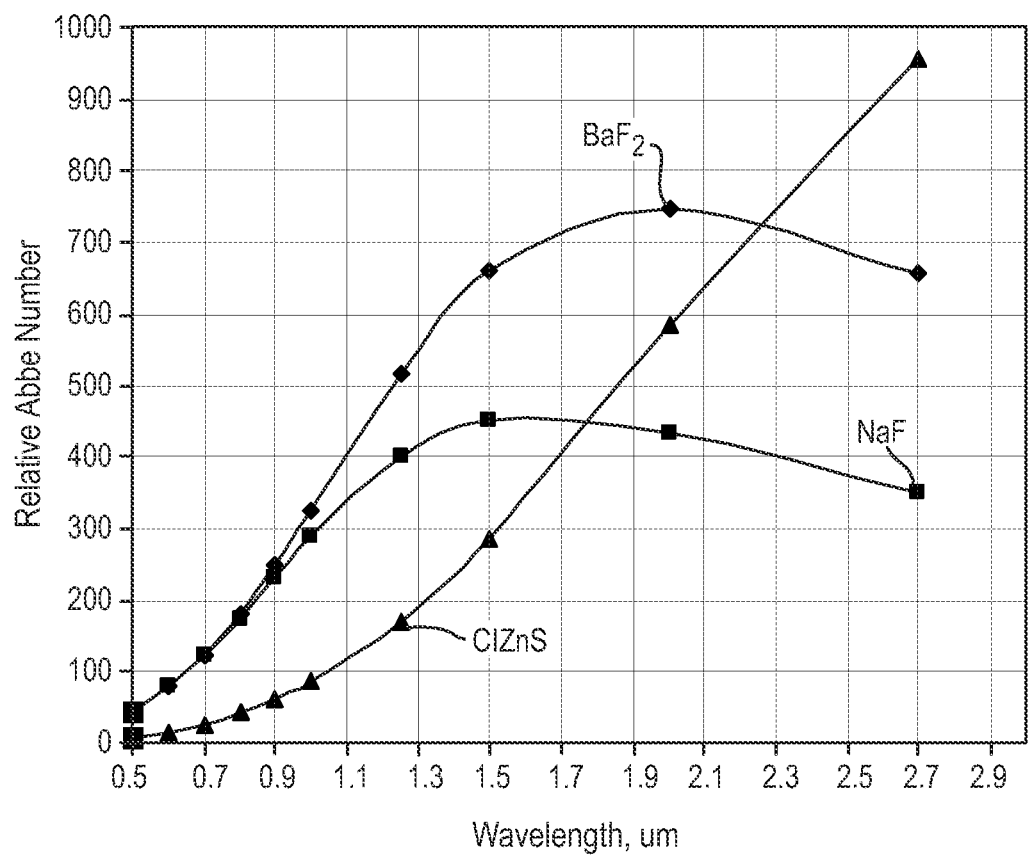
FIG. 5 shows a more detailed view of the plot shown in FIG. 4 for wavelengths from 0.5 to 3.0 μm.

FIG. 5 shows a more detailed view of the plot shown in FIG. 4 for wavelengths from about 0.5 to 3.0 µm. As more clearly shown, below about 1.5 µm, $BaF_2$ and NaF become very similar in dispersion to effectively form an achromatic pair. ClZnS, on the other hand, is more dispersive (flint-like) than NaF below 1.8 µm, and assumes the flint role at these shorter wavelengths. At wavelengths greater than 2.3 µm, ClZnS is considerably less dispersive (crown-like) than $BaF_2$ and therefore contributes very little to color correction.

Clear transient zinc sulfide (ClZnS) may be sold as "water-clear" zinc sulfide or "water-pure" zinc sulfide, for instance, under the trademarks Cleantran® and Irtran®. ClZnS functions to provide dispersion in this region from about 0.5 µm to 1.0 µm. At about 0.5 µm, the Abbe number of ClZnS is approximately 11. After about 1.0 µm, ClZnS has very crownish Abbe number (i.e., in excess of 500, for instance, at 4.5 µm), and that material is no longer involved in the color correction. This is beneficial to the overall optical assembly because, after about 1.5 µm, $BaF_2$ and NaF have a significant Abbe number difference (e.g., the Abbe difference is about 50-100).

FIG. 6 shows a raytrace schematic of optical assembly 600 according to an embodiment. Optical assembly 600 may include first lens 610, second lens 620, third lens 630, fourth lens 640, fifth lens 650, and sixth lens 660. First through third lenses 610-630 may be arranged to form an objective, while fourth through sixth lenses 640-660 may be arranged to form an eyepiece. A housing (not shown) may be provided to support the various lens elements, as known in the art. In one implementation, optical assembly 600 may be approximately 4.0 inches in length and 1.0 inches in diameter.

In use, light rays 601 in space 605 pass through first lens 610, space 615, second lens 620, space 625, third lens 630, space 635, fourth lens 640, space 645, fifth lens 650, space 655, sixth lens 660, to space 665.

Using optical assembly 600 causes the focal plane array (FPA) to achieve a greater field of view (FOV), but through a smaller aperture. As mentioned above, an afocal telescope does not have an intermediate image (or final image). Rather, collimated light enters the telescope, and collimated light exits the telescope. The telescope of an embodiment is Galilean in that there is no intermediate image, as opposed to Newtonian telescopes which have intermediate images. Newtonian telescopes have real exit pupils while Galilean telescopes do not have real exit pupils.

Optical assembly 600 may be configured, for instance as shown, as a wide-field of view (WFOV) Galilean afocal telescope or attachment, for use in a helicopter targeting turret system (or similar system).

The afocal Galilean telescope may include: an objective assembly having a secondary flint lens 610 comprised of zinc sulfide (ZnS); a positive-power crown lens 620 comprised of barium fluoride ($BaF_2$); and a negative-power primary flint lens 630 comprised of sodium fluoride (NaF); and an eyepiece assembly having a positive-power primary flint lens 640 comprised of sodium fluoride (NaF); a negative-power crown lens 650 comprised of barium fluoride ($BaF_2$); and a secondary flint lens 660 comprised of zinc sulfide (ZnS).

From the raytrace shown in FIG. 6, it can be seen that the ClZnS lenses, i.e., first and sixth lenses 610, 660, have very little negative optical power. This is all that may be necessary, considering the very dispersive Abbe number of 11. The two ClZnS lenses, 610, 660—being positioned on the outsides of the optical assembly 600—also provide environmental protection for the $BaF_2$ and NaF lenses, i.e., second through fifth lenses 620-650, that are internal to optical assembly 600.

Table 3 shows one example optical prescription for an embodiment of optical assembly 600. The afocal magnification is approximately 4×, by taking an aperture of 0.660 inches and a FOV of 9.4 degrees in object space, and converting it into an aperture of 0.164 inches (4× smaller) and FOV of 36.6 degrees (4× larger). Optical assembly 600 is designed in the direction shown in the table, but is actually used in the reverse: the smaller aperture and wider FOV faces object space, while the larger aperture and smaller FOV is on the FPA side of the optics path. Between this afocal attachment and the FPA there may be an imager optics (not shown).

Optical assembly 600 may be configured to transmit wavelengths of light from about 0.48 µm to 10.6 µm, or approximately 22 octaves. This provides transmission in not only the visible and MWIR spectra, but also in the LWIR spectra, a dramatic improvement over conventional approaches.

Table 3 shows an optical prescription for the optical assembly 600 shown in FIG. 6, according to an embodiment.

TABLE 3

PRESCRIPTION FOR VISIBLE, MWIR, AND LWIR AFOCAL TELESCOPE

| Surface | Radius | Thickness | Material | CC | Ad | Ae | Af | Ag |
|---|---|---|---|---|---|---|---|---|
| 605 | inf | 1.570 | air | | | | | |
| 610 | −10.946 | 0.100 | ClZnS | | | | | |
| 615 | −20.594 | 0.010 | air | | 1.498E-02 | −8.515E-02 | 0.4131 | −1.0145 |
| 620 | 1.312 | 0.260 | BaF$_2$ | | | | | |
| 625 | −1.951 | 0.01 | air | −4.4568 | −3.268E-02 | 0.1917 | −0.7185 | 1.8735 |
| 630 | −2.366 | 0.100 | NaF | | | | | |
| 635 | 1.525 | 2.504 | air | | | | | |
| 640 | 0.911 | 0.340 | NaF | | | | | |
| 645 | −0.836 | 0.006 | air | | | | | |
| 650 | −0.381 | 0.100 | BaF$_2$ | −2.0045 | 0.2676 | −2.565 | 2.9145 | 1.7094 |
| 655 | 0.676 | 0.192 | air | | | | | |
| 660 | 1.435 | 0.100 | ClZnS | | −0.1895 | 0.4509 | 1862 | −5.429 |
| 665 | 1.608 | 0.500 | air | | | | | |

Entrance aperture: 0.660 diameter
Entrance FOV: 9.4 deg total
Afocal magnification: 4.01X
Spectral bands: 0.45-0.75 um, and 3.7-4.8 um, and 8.0-10.6 um
Ad, Ae, Af, Ag are aspheric constants
CC is a conic constant The particular lens types shown are not to be construed as limiting. It should be appreciated that, in other implementations, the lens elements may be different types, sizes, and/or configurations. For instance, optical assembly 600 could be used in a reversed configuration.

According to a further embodiment, the conventional wide-field of view (WFOV) Galilean afocal telescope such as optical assembly 100 (FIG. 1) used in a helicopter targeting turret system (or similar system) may be replaced with an optical assembly according to the present disclosure.

For instance, a vehicle and/or system including the conventional wide-field of view (WFOV) Galilean afocal telescope, such as optical assembly 100 (FIG. 1), may be taken into service. One or more service centers may be provided, which include specialized equipment and personnel for serving these systems. The services centers may be located on military bases, government installations, and/or on premises that are owned or operated by defense contractors. Moreover, these service centers may provide other services and repairs for the vehicles or systems which utilize these optical assemblies.

The conventional telescope assembly may be removed. As will be appreciated, various fasteners, connectors, harnesses, etc. may need to be released and/or removed to provide access to the telescope. The removed telescope units may be discarded or dismantled for recycling the components thereof. Next, an optical assembly according to one or more disclosed embodiments, such as optical assembly 600, may be installed in the targeting turret system. This may require reassembling the various fasteners, connectors, harnesses, etc. to retain the newly installed telescope. The vehicle or system may then be returned to duty. Other systems which utilized optical systems and telescope may similarly be serviced or refurbished. Accordingly, the optical system provides a form, fit and function replacement to the conventionally known and potentially obsolete telescopes used in service.

The optical assemblies disclosed according to one or more embodiments are advantageously configured for achieving transmission in the visible, MWIR and LWIR portions of the electromagnetic spectrum. Moreover, optical assembly 600 may be simpler in construction than conventional optical assembly 100. In fact, optical assembly 600 includes one fewer lens element than conventional optical assembly 100.

Other embodiments, uses and advantages of the inventive concept will be apparent to those skilled in the art from consideration of the above disclosure and the following claims. The specification should be considered non-limiting and exemplary only, and the scope of the inventive concept is accordingly intended to be limited only by the scope of the following claims.

What is claimed is:

1. An optical lens assembly comprising:
   a first lens comprising a crown material at least for wavelengths in a range from about 0.5 µm to about 10.5 µm;
   a second lens comprises a primary flint material for wavelengths-in a range from about 1.0 µm to about 10.5 µm; and
   a third lens comprising a secondary flint material for wavelengths below about 1.0 µm,
   wherein the first, second and third lenses together are configured to transmit light and function in the visible, mid-wavelength infrared (MWIR) and long-wavelength infrared (LWIR) regions of the electromagnetic spectrum.

2. The optical lens assembly according to claim 1, wherein the crown material comprises barium fluoride (BaF$_2$);
   the primary flint material comprises sodium fluoride (NaF); and
   the secondary flint material comprises of zinc sulfide (ZnS).

3. The optical lens assembly according to claim 2, wherein the zinc sulfide (ZnS) comprises clear transient zinc sulfide (ClZnS).

4. The optical lens assembly according to claim 1, wherein the crown, the primary flint and the secondary flint are configured as an afocal Galilean telescope.

5. The optical lens assembly according to claim 4, wherein the crown, the primary flint and the secondary flint are arranged as an objective lens assembly, an eyepiece lens assembly, or both.

6. The optical lens assembly according to claim 1, wherein the optical assembly is substantially transparent to wavelengths of light between about 0.5 and 11.0 µm.

7. The optical lens assembly according to claim 1, wherein a length of the optical lens assembly is approximately 4.0 inches and a width of the optical lens assembly is approximately 1.0 inch in diameter.

8. The optical lens assembly according to claim 1, wherein the secondary flint is configured to provide color correction for wavelengths below about 1 µm.

9. An afocal Galilean telescope comprising:
a positive-power objective lens assembly comprising:
a first negative-power lens comprising a primary flint material at least for wavelengths above about 0.5 µm to about 10.5 µm;
a second positive-power lens comprising a crown material at least for wavelengths above about 1.0 µm to about 10.5 µm; and
a third negative-power lens comprising a secondary flint material at least for wavelengths below about 1.0 µm; and
a negative-power eyepiece lens assembly comprising:
a fourth positive-power lens comprising a primary flint material at least for wavelengths above about 0.5 µm to about 10.5 µm;
a fifth negative-power lens comprising a crown material at least for wavelengths above about 1.0 µm to about 10.5 µm; and
a sixth positive-power lens comprising a secondary flint material at least for wavelengths below about 1.0 µm,
wherein the objective lens assembly and the eyepiece lens assembly together are arranged and configured to transmit light and function in the visible, mid-wavelength infrared (MWIR) and long-wavelength infrared (LWIR) regions of the electromagnetic spectrum.

10. The afocal Galilean telescope according to claim 9, wherein
one or both of the crown materials comprise barium fluoride ($BaF_2$);
one or both of the primary flint materials comprise sodium fluoride (NaF); and
one or both of the secondary flint materials comprise of zinc sulfide (ZnS).

11. The afocal Galilean telescope according to claim 10, wherein the zinc sulfide (ZnS) comprises clear transient zinc sulfide (ClZnS).

12. The afocal Galilean telescope according to claim 9, wherein the telescope assembly is substantially transparent to wavelengths of light between about 0.5 and 11.0 µm.

13. The afocal Galilean telescope according to claim 9, wherein a length of the afocal Galilean telescope is approximately 4.0 inches and a diameter of the afocal Galilean telescope is approximately 1.0 inch.

14. The afocal Galilean telescope according to claim 9, wherein one or both of the secondary flint materials are configured to provide color correction for wavelengths below about 1 µm.

15. A method of servicing a targeting turret system comprising:
removing a telescope assembly from the targeting turret system; and
installing the afocal Galilean telescope of claim 9 into the targeting turret system.

16. The method according to claim 15, further comprising:
providing one or more service centers configured to perform service or repairs for the targeting turret system.

* * * * *